US011267582B2

(12) United States Patent
Thelander

(10) Patent No.: US 11,267,582 B2
(45) Date of Patent: Mar. 8, 2022

(54) JALOUSI WALL ASSEMBLY FOR A PASSENGER BRIDGE

(71) Applicant: FMT INTERNATIONAL TRADE AB, Trelleborg (SE)

(72) Inventor: Per Thelander, Höllviken (SE)

(73) Assignee: FMT INTERNATIONAL TRADE AB, Malmö (SE)

(*) Notice: Subject to any disclaimer, the term of this patent is extended or adjusted under 35 U.S.C. 154(b) by 45 days.

(21) Appl. No.: 16/765,342

(22) PCT Filed: Nov. 19, 2018

(86) PCT No.: PCT/SE2018/051195
§ 371 (c)(1),
(2) Date: May 19, 2020

(87) PCT Pub. No.: WO2019/098939
PCT Pub. Date: May 23, 2019

(65) Prior Publication Data
US 2020/0354082 A1   Nov. 12, 2020

(30) Foreign Application Priority Data
Nov. 20, 2017   (SE) .................................... 1751426-6

(51) Int. Cl.
*B64F 1/305* (2006.01)
*E01D 15/24* (2006.01)
*B63B 27/14* (2006.01)

(52) U.S. Cl.
CPC ............ *B64F 1/3055* (2013.01); *E01D 15/24* (2013.01); *B63B 27/14* (2013.01); *B63B 2027/141* (2013.01)

(58) Field of Classification Search
CPC . E01D 15/24; B64F 1/3055; B63B 2027/141; B63B 27/14

(Continued)

(56) References Cited

U.S. PATENT DOCUMENTS 3,060,471 A    10/1962  Der Yuen et al.
3,315,291 A *  4/1967  Wollard ................ B64F 1/3055
                                                        14/71.5

(Continued)

FOREIGN PATENT DOCUMENTS

CN    2290549 Y    9/1998
CN    2853604 Y    1/2007

(Continued)

OTHER PUBLICATIONS

Supplementary European Search Report dated Nov. 13, 2020 for corresponding European Application No. EP 18 87 9225.

(Continued)

*Primary Examiner* — Raymond W Addie
(74) *Attorney, Agent, or Firm* — Pearne & Gordon LLP

(57) ABSTRACT

A jalousi wall assembly for a passenger bridge, which jalousi wall assembly including a first jalousi wall in turn having a first end and a second end, which first end is arranged to be wound up on, and off from, a first roll with a first vertical rotation axis (A2), and which second end is arranged to be fastened to the passenger bridge, wherein the first roll is arranged to be fastened to the frame of a movable opening of the passenger bridge and to follow horizontal movements of the frame by the first jalousi wall being wound up on, or off from, the first roll, whereby a horizontal length of the first jalousi wall, between the first end and the second end, is adjusted in response to a horizontal movement of the frame. The application relates to a jalousi wall assembly further including a wire having a first and a second end, which first end is wound about the first vertical rotation axis (A2) such that the first jalousi wall is wound up on the first roll when the wire is pulled at its second end, and in that the jalousi wall assembly further includes a wire tension (Continued)

device including a gas spring arranged to maintain a tension in the wire while the frame moves.

11 Claims, 4 Drawing Sheets

(58) Field of Classification Search
USPC .......................................................... 14/71.5
See application file for complete search history.

(56) References Cited

U.S. PATENT DOCUMENTS

| | | | |
|---|---|---|---|
| 3,402,412 A | | 9/1968 | Seipos |
| 3,412,412 A | * | 11/1968 | Kjerulf .................. B64F 1/3055 14/71.5 |
| 4,318,198 A | * | 3/1982 | Drozd .................. B64F 1/3055 14/71.5 |
| 4,333,194 A | * | 6/1982 | Drozd .................. B64F 1/3055 14/71.5 |
| 4,852,197 A | * | 8/1989 | Thomas, Jr. .......... B64F 1/3055 14/71.5 |
| 5,791,003 A | * | 8/1998 | Streeter .................. B64F 1/305 14/71.5 |
| 6,212,724 B1 | * | 4/2001 | Zhou ..................... B64F 1/3055 14/69.5 |
| 9,682,750 B2 | | 6/2017 | Thelander |

FOREIGN PATENT DOCUMENTS

| | | |
|---|---|---|
| CN | 202208360 U | 5/2012 |
| GB | 1139632 A | 1/1969 |
| SE | 1351035 A1 | 3/2015 |

OTHER PUBLICATIONS

International Search Report from Corresponding International Application No. PCT/SE2018/051195 dated Jan. 31, 2019.
Written Opinion from Corresponding International Application No. PCT/SE2018/051195 dated Jan. 31, 2019.
International Preliminary Report on Patentability from Corresponding International Application No. PCT/SE2018/051195 dated Oct. 7, 2019.

\* cited by examiner

JALOUSI WALL ASSEMBLY FOR A PASSENGER BRIDGE

FIELD OF THE INVENTION

The present invention relates to a passenger bridge, such as for a ship. In particular, the invention relates to a passenger bridge comprising a bridge head in turn comprising a cabin with a passenger entry/exit opening, and to a jalousi wall assembly of the bridge head. The invention further relates to such a jalousi wall assembly as such.

BACKGROUND OF THE INVENTION

A bridge head is a structure arranged at a distal end of a passenger bridge segment, comprising a cabin which rotatingly engages with a main body of the bridge head, typically by being displaced along an outer periphery of the said main body, such as in a horizontal plane, which periphery may be semi-circular. Via the cabin, passengers can pass between the passenger bridge and a door opening in a ship or the like. Such bridge heads are known from, inter alia, SE 1351035-9.

The horizontal turnability of the cabin accomplishes that the cabin can be horizontally pivoted in relation to said distal end of the passenger bridge, to allow various angles between the passenger bridge and the said door opening.

Conventionally, such bridge heads are equipped with folding jalousi walls, covering the sides of the bridge head which is not occupied by the cabin. As the cabin moves horizontally, the jalousi wall on one side of the cabin unfolds to become wider and the jalousi wall on the other side of the cabin folds to become narrower, so that the bridge head sides are covered by either jalousi wall or cabin at all times.

The term "jalousi wall", as used herein, is intended to denote a construction similar to that of a jalousi sliding door of a conventional jalousi cabinet. Hence, such a jalousi wall is intended for being slided, such as sideways, following a curved wall contour. Such a jalousi wall may comprise a number of elongated, rigid pieces, such as vertically arranged, that are joined together so that they are always parallel to each other but so that they can pivot in relation to each other in a way so that the jalousi wall can follow said wall contour as the jalousi wall slided along said contour, such as horizontally.

Advantageously, such jalousi wall folding mechanism is automatic, following the cabin movements. This is preferably the case also for a jalousi wall assembly according to the invention. To accomplish this, the jalousi wall on either side of the cabin has a first respective end which is wound up on a respective vertically arranged roll with a vertical axis, while a respective opposite, second end of each jalousi wall is permanently fastened to the bridge head. In order to provide automatic folding of the jalousi walls when the cabin moves in both directions, the rolls are conventionally spring-loaded, so that the respective jalousi wall is wound up in the absence of a horizontal pulling force applied to an end part of the jalousi wall in question. This spring loading conventionally uses a torsion spring arranged inside the roll in question. As will be described in the following, the present invention uses a different approach to achieve such automatic operation of the jalousi wall.

The conventional construction provides good performance in terms of folding and unfolding of the jalousi walls. However, for maintenance it is complicated and time-consuming to access the torsion spring, such as for replacement of the torsion spring.

BRIEF SUMMARY OF THE INVENTION

The present invention solves the above described problems.

Hence, the invention relates to a jalousi wall assembly for a passenger bridge, which jalousi wall assembly comprises a first jalousi wall in turn having a first end and a second end, which first end is arranged to be wound up on, and off from, a first roll with a first vertical rotation axis, and which second end is arranged to be fastened to the passenger bridge, wherein the first roll is arranged to be fastened to the frame of a movable opening of the passenger bridge and to follow horizontal movements of the said frame by the first jalousi wall being wound up on, or off from, the first roll, whereby a horizontal length of the first jalousi wall, between the first end and the second end, is adjusted in response to a horizontal movement of said frame, which jalousi wall is characterised in that the jalousi wall assembly further comprises a wire having a first and a second end, which first end is wound about said first vertical rotation axis such that the first jalousi wall is wound up on the first roll when the wire is pulled at its second end, and in that the jalousi wall assembly further comprises a wire tension means comprising a gas spring arranged to maintain a tension in the wire while the frame moves.

BRIEF DESCRIPTION OF THE DRAWINGS

In the following, the invention will be described in detail, with reference to exemplifying embodiments of the invention and to the enclosed drawings, wherein.

DESCRIPTION OF THE EMBODIMENTS

Figure 1:
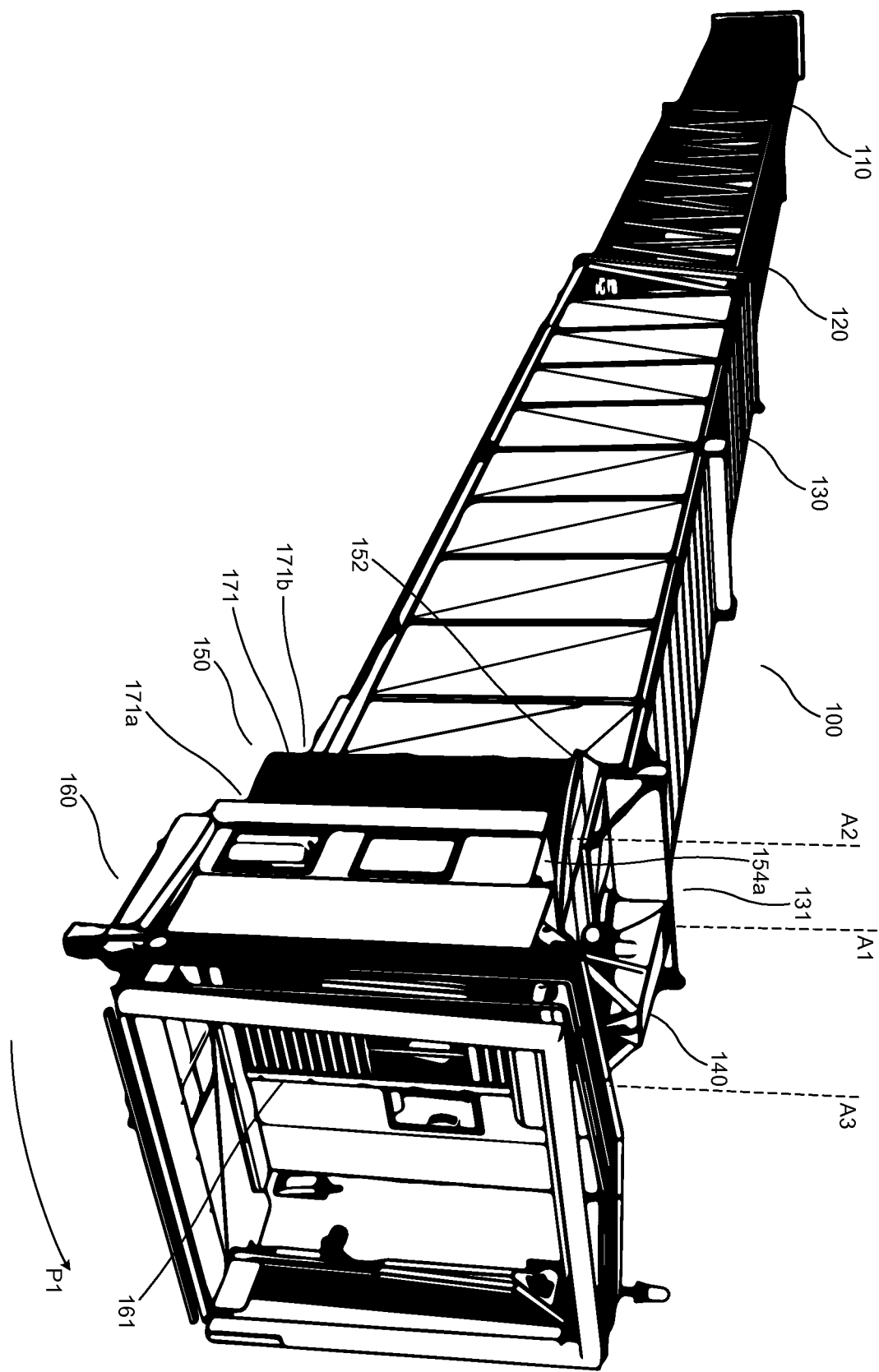
FIG. 1 is a perspective view of a passenger bridge according to the present invention.
Figure 2:
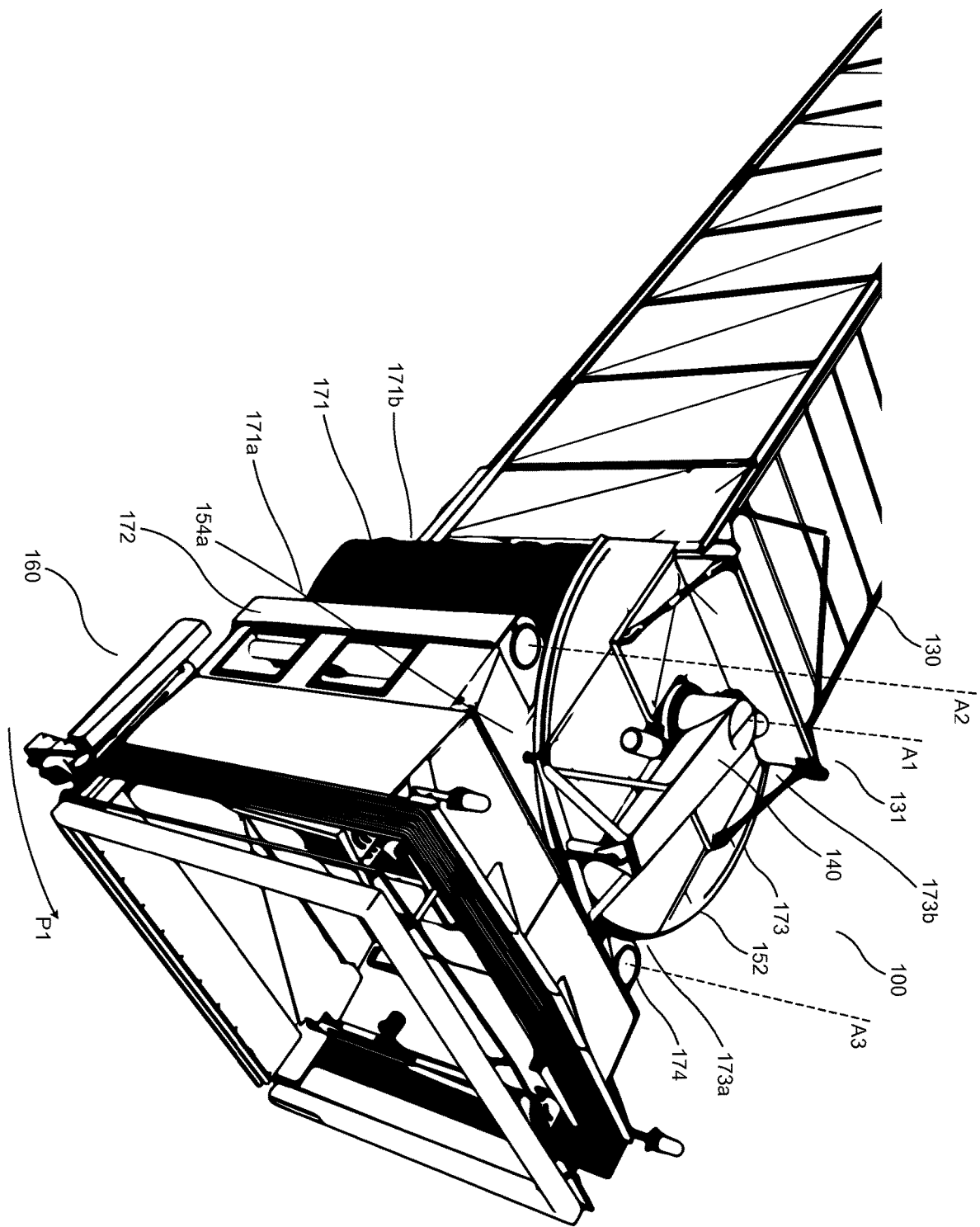
FIG. 2 is a detail perspective view of a bridge head of the passenger bridge illustrated in FIG. 1.
Figure 3:
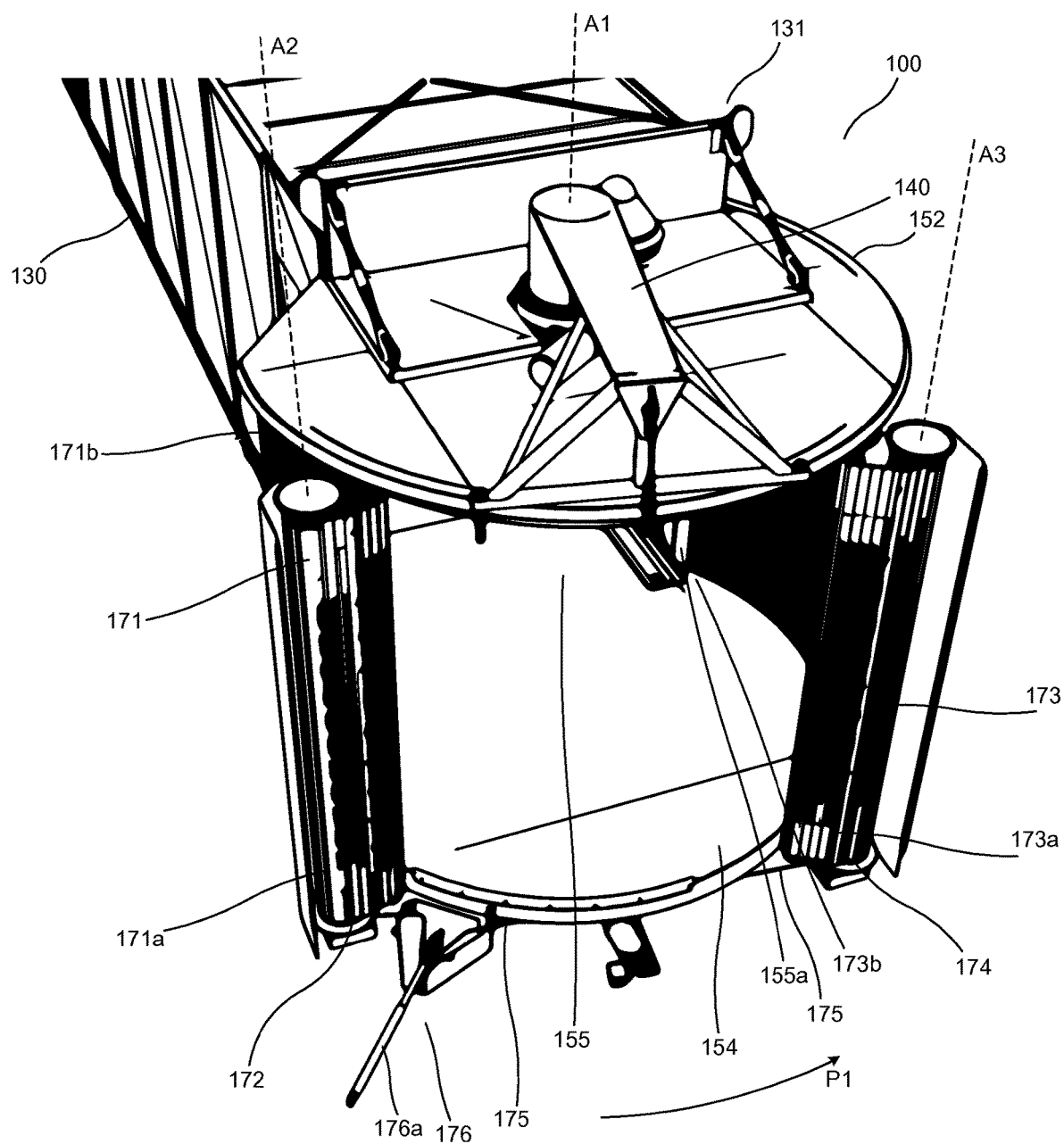
FIG. 3 is a partly removed detail top perspective view of the bridge head of the passenger bridge illustrated in FIG. 1, with the cabin removed.
Figure 4:
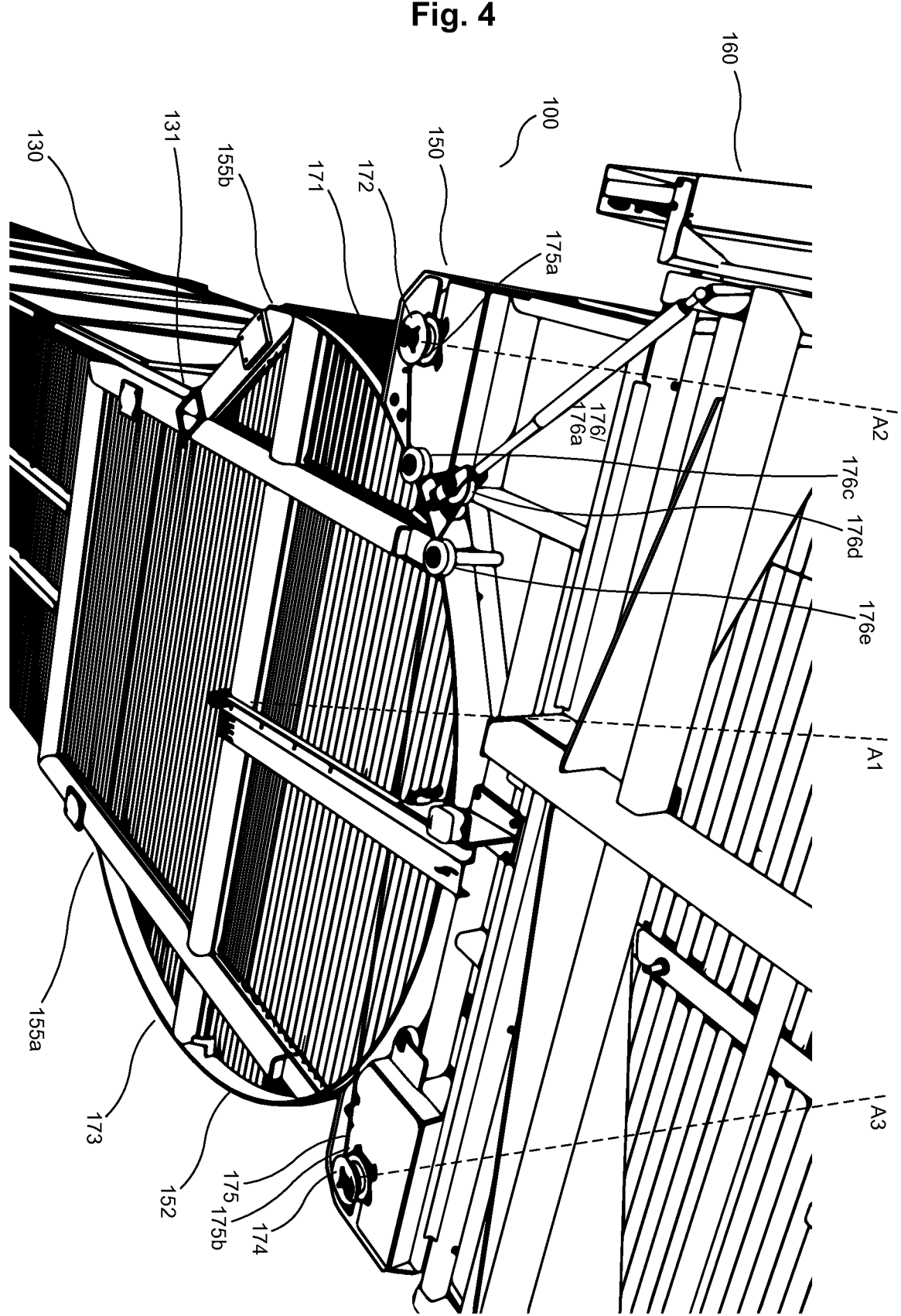
FIG. 4 is a partly removed detail bottom perspective view of the bridge head illustrated in FIG. 1.

All figures share the same set of reference numerals and are generally drawn to scale to show a particular exemplifying, preferred embodiment of the present invention.

Hence, FIG. 1 illustrates a passenger bridge 100 according to the present invention. The passenger bridge 100 is preferably intended and arranged for taking walking passengers to and from a door opening in the hull of a ship, but may also be used for other purposes, such as taking passengers to and from an airplane.

In general, the passenger bridge 100 comprises at least one passenger bridge segment 110, 120, 130. In the Figures, three such segments 110, 120, 130 are shown. Preferably, the passenger bridge comprises at least two such segments. Preferably, the segments 110, 120, 130 are telescopically arranged in relation to each other, with a largest cross section segment 110 arranged at a first end of the passenger bridge 100 and a smallest cross section segment 130, also denoted "bridge end segment", arranged at a second, distal end of the passenger bridge 100. During use, passengers may move through the segments 110, 120, 130 in order, on their way to and from a bridge head 150 which is also comprised in the passenger bridge 100 and via which passengers can move into and out from the bridge 100, from or to a ship or the like.

Hence, the bridge head 150 is arranged at, and connected to, a distal end 131 of the bridge end segment 130.

Moreover, the bridge head 150 in turn comprises a cabin 160 with an entry/exit door 161 for passengers. The cabin 160 is arranged to move about an outer periphery 152 of the bridge head 150, and comprises an entry/exit door 161 for passengers. Hence, the cabin 160 and its door 161 can move along said outer periphery 152 of the bridge head 150, allowing the passenger bridge 100 to cater for passenger transfer in selectable horizontal directions, by turning the cabin 160.

Furthermore, the passenger bridge 100 comprises a cabin suspension 140, arranged to allow the cabin 160 to rotate in relation to the bridge head 150 about a vertical axis A1, in a horizontal swing plane P1. Such rotation is preferably possible across an angular interval of at least 45°, preferably at least 90°, and furthermore of at the most 270°, preferably at the most 180°. Hence, as the term is used in this context, that the cabin 160 is arranged to "rotate" in relation to the bridge head 150 does not imply full 360° rotations, but a rotary motion across a more limited angular interval.

Hence, the suspension 140 is arranged to drive the cabin 160 in such rotary movement. This drive is controlled by a control device (not shown in the Figures), allowing an operator to manually or automatically direct the cabin 160 door 161 in a desired horizontal direction depending on operating conditions. The control device can preferably control this horizontal angle over a continuous spectrum of angles, as opposed to a limited number of discreet angular positions.

As is seen in the Figures, the bridge head 150 comprises a jalousi wall assembly 170. The jalousi wall assembly 170 according to the invention is arranged for use as a wall assembly in a passenger bridge 100 according to the invention, and specifically in a bridge head 150 according to the invention. In other words, it is specifically adapted for such use. Such adaptations may, for instance, comprise adaptations in terms of dimensions, fastening points, strength and robustness.

The jalousi wall assembly 170 comprises a first jalousi wall 171, in turn having a first end 171a and a second end 171b. The first end 171a is arranged to be wound up on, and off from, a first roll 172. The first roll, having a first vertical roll rotation axis A2, is arranged to wind the first jalousi wall 171 up, such as on a central metal cylinder to which the first end 171a is fastened, so that the jalousi wall 171 as a result forms a roll about the vertical axis A2. Preferably, the roll 172 itself does not comprise a spring means, and would allow the jalousi wall 171 to be wound up onto or off from the roll 172 freely in the hypothetical case in which the jalousi wall 171 is not spring-loaded in any way.

The second end 171b of the first jalousi wall 171 is arranged to be fastened, and is preferably in fact fastened, to the passenger bridge 100, preferably to the bridge head 150, preferably at a side end 155a of an opening 155 between the distal end segment 130 and the bridge head 150.

Furthermore, the first roll 172 is arranged to be fastened, and is preferably in fact fastened, to a frame 154a of a movable opening 154 of the passenger bridge 100, preferably of the bridge head 150 and preferably providing an open passage for passenger transit between the bridge head 150 and the cabin 160. Because it is fastened to the said frame 154a, the first roll 172 is arranged to rigidly follow horizontal movements of the said frame 154a. When the first roll 172 follows such horizontal movements, it does so by the first jalousi wall 171 being wound up on, or off from, the first roll 172, whereby a horizontal length of the first jalousi wall 171, between the first end 171a and the second end 171b, is adjusted in response to a horizontal movement of the frame 154a. Hence, when the frame 154a moves in a horizontal direction away from the second end 171b, the jalousi wall 171 becomes horizontally longer, and vice versa.

The term "frame" 154a, as used herein, should be construed broadly, encompassing every structure which is fixedly related to the opening 154 and in some way defining or forming a boundary for the opening 154. Hence, such a "frame" can be a side panel arranged beside the opening 154, or in that the roll 172 as such forms a side of the opening 154.

According to the invention, the jalousi wall assembly 170 further comprises a e 175 having a first 175a and a second 175b end. The first end 175a of the wire 175 is wound about the first vertical roll rotation axis A2 such that the first jalousi wall 171 is wound up on the first roll 172 when the wire 175 is pulled at its second end 175b, hence applying a pulling force along the wire 175 forcing the first end 175a, by a tensile tension, towards the pulling force application point.

Furthermore according to the invention, the jalousi wall assembly 170 comprises a wire tension means 176, comprising at least one gas spring 176a arranged to maintain a tension in the wire 175 while the frame 154a moves in either horizontal direction.

The wire tension means 176 may act in any suitable way, such as the preferred one described below, as long as it maintains a longitudinal tension (i.e. a tensile stress) in the wire 175, and in particular as the frame 154a moves horizontally so as to force the first jalousi wall 171 to become horizontally longer or shorter, and forcing the first jalousi wall 171 to be wound up onto or off from the first roll 172 in a manner corresponding to the said length change. It is important that the wire tension means 176 is arranged to maintain a certain predetermined minimum tensile stress in and along the wire 175, such as at least 100 N for all allowed horizontal positions of the frame 154a.

It is realized that this can be accomplished for a single jalousi wall 171 with a single roll 172, such as by fastening the second end 175b of the wire 175 to a suitable place on the bridge head 150 in the preferred case in which the jalousi wall assembly 170 is used for covering the vertical sides of a bridge head 150 with a movable cabin 160.

However, it is preferred that the jalousi wall assembly 170 also comprises a second jalousi wall 173, arranged to form a vertical wall on an opposite side of the frame 154a as compared to the first jalousi wall 171. In this case, the first 171 and second 173 jalousi walls are horizontally lengthened or shortened in a substantially symmetrical opposite fashion as the frame 154a moves—as the first jalousi wall 171 becomes longer due to the frame 154a moving away from the second end 171b, the second jalousi wall 173 becomes shorter in the corresponding way, as a result of the second jalousi wall 173 being wound up onto a second roll 174, which is fastened to a horizontally opposite side of the frame 154a as compared to the first roll 172.

Namely, the second jalousi wall 173 has a third end 173a and a fourth end 173b. The third end 173a is arranged to be wound up on, and off from, the second roll 174 about a second vertical roll rotation axis A3. The fourth end 173b is arranged to be fastened, and is preferably in fact fastened, to the passenger bridge 100, preferably to the bridge head 150, preferably at a side end 155b (an opposite end as compared to the fastening point of the first end 171a of the first jalousi wall 171) of said opening 155 between the distal end segment 130 and the bridge head 150. The second roll 174 is preferably arranged to be fastened to the frame 154a in the said way, and to follow horizontal movements of the frame 154a by the second jalousi wall 173 being wound up on, or off from, the second roll 174, whereby a horizontal length of the second jalousi wall 173, between the third end 173a and the fourth end 173b, is adjusted in response to a horizontal movement of said frame 154a.

Hence, the first 171 and second 173 jalousi walls are similar. However, they may be mirrored, so that the first 172 and second 174 rolls are arranged to wind up the respective jalousi wall 171, 173 in opposite rotary directions.

Further preferably, the second end 175b of said wire 175 is wound about said second vertical roll rotation axis A3, such that the second jalousi wall 173 is wound up on the second roll 174 when the wire 175 is pulled at its first end 175a.

Hence, the wire 175 ends 175a, 175b are fastened to, and therefore engage with, the respective rolls 172, 174 in a rotary engagement with respect to said rolls 172, 174.

Hence, in this preferred embodiment, the first 172 and second 174 rolls are interconnected by the wire 175, which, via said tensile force, both pulls them towards each other in the horizontal direction and pulls them both into a wound-up rotary direction, in effect providing a certain resistance from being unwound.

Such a construction solves the above described problems. In particular, it allows for arranging the wire tension means 176 completely externally to the rolls 172, 174, which is preferred, which in turns makes it possible to perform installation, maintenance and replacement of the wire tension means 176 without having to demount the rolls 172, 174 or even the jalousi walls 171, 173. This advantage is equally applicable in the case in which only one jalousi wall 171 is used. The preferred case in which the wire 175 is fastened to a respective bottom part of each roll 172, 174, at a level below a cabin 160 floor, also provides for easy replacement and maintenance of the wire 175 itself. In particular, one, or a few, gas springs can easily be dimensioned so as to provide a required tensile force in the wire 175.

In the following, a number of preferred detailed embodiments are described, for exemplifying purposes and in order to provide a better understanding of the basic principles of the invention.

Hence, it is preferred that a total horizontal length of the first 171 and second 172 jalousi walls remains constant as the frame 154a moves horizontally, as a result of the rolls 172, 174 moving an equal horizontal distance.

Furthermore, at least one, preferably each, of said gas springs 176a is arranged to apply a pulling force perpendicularly to a local wire 175 direction. Hence, rather than pulling at a wire 175 end, the gas spring 176a in question preferably applies said tensile tension by pulling the wire 175 sideways, at a force application point between the wire 175 ends 175a, 175b. Preferably, each gas spring 176a accomplishes a pulling force of between 100 N and 10 000 N.

According to a preferred embodiment, the wire tension means 176 comprises at least two gas springs 176a, arranged to apply a wire tension force at two different locations along the wire 175 between its engagement with the first roll 172 and its engagement with the second roll 174.

Advantageously, the wire tension means 176 comprises a pulley system 176c-176e, allowing the wire 175 to move freely along its length direction by rolling over the pulleys 176c-176d. The pulleys 176c-176e are preferably fixed in relation to the cabin 160.

In particular, it is preferred that each gas spring 176a is arranged to apply its wire tensile stress-resulting pulling force to the wire 175 via a respective spring loaded pulley 176d which is in rolling engagement with the wire 175. In this case, as is shown in the Figures, the wire tension means 176 further comprises two respective additional pulleys 176c, 176e, arranged on either side of each spring loaded pulley 176d in question. These two additional pulleys 176c, 176e are then in rolling engagement with the wire 175 and arranged to apply a counterforce to the spring loaded pulley 176d in question. The two additional pulleys 176c, 176e are preferably fixedly mounted and not spring-loaded. Hence, the three pulleys 176c, 176d, 176e form a triangle, pulling the wire 175 passing between them in two opposite lateral directions.

Furthermore, as indicated above it is preferred that the two additional respective pulleys 176c, 176e are fixedly connected to the cabin 160. Hence, the said triangle will move with the frame 154a and with the respective roll 172, 174 in question.

According to a preferred embodiment, each gas spring 176a is connected at a first end to the cabin 160, and at a second, opposite, end to the respective spring loaded pulley 176d. This provides for very simple maintenance and replacement of the gas spring 176a in question.

In addition, it is preferred that the wire 175 does not engage with the bridge head 150 at all, apart from at its first and second ends 175a, 175b engaging with the said first and second rolls 172, 174. The remainder of the engagement points of the wire 175, in the example shown in the Figures the pulleys 176c-176e, are all with the cabin 160. It is noted that this doesn't count indirect engagements due to the fact that the bridge head 150 engages with the cabin 160.

In all the cases described herein, it is preferred that neither the first 172 nor the second 174 roll is spring-loaded in itself, apart from the tension provided by the wire 175. This means, among other things, that there is preferably no torsion spring inside and along the roll 172, 174 in question.

As mentioned above, the invention also relates to a bridge head 150 of the above-described type, for a passenger bridge 100, which bridge head 150 comprises or is connected to a cabin 160. Then, the bridge head 150 comprises a first opening to the passenger bridge end segment 130 and a second opening to the cabin 160. The bridge head 150 then further comprises a jalousi wall assembly 170 of the above described type, arranged to cover both a first and a second vertical side wall of the bridge head 150, running between the said first and second openings on one respective side of the bridge head 150 each, with the first 171a and third 173a ends of the jalousi walls 171, 173 fixedly fastened to opposite sides of the first opening and the first and second rolls 172, 174 of the jalousi walls 171, 173 fixedly fastened to either side of the second opening.

Furthermore, the invention also relates to a passenger bridge 100 comprising a passenger bridge end segment 130 of the above described type. Then, the passenger bridge 100 comprises a bridge head 150 according to the above, arranged with the jalousi wall assembly 170 according to the invention and as described above, which bridge head 150 is arranged at a distal end 131 of said bridge end segment 130.

Preferably, the jalousi wall assembly 170 does not comprise any type of motor or other driving means to move the rolls 172, 174, apart from being pulled or pushed by the frame 154a moving.

Above, preferred embodiments have been described. However, it is apparent to the skilled person that many modifications can be made to the disclosed embodiments without departing from the basic idea of the invention.

For instance, the passenger bridge 100 may comprise more or fewer sections 110, 120, 130 than the ones shown in the Figures.

Moreover, the bridge head 150 and the cabin 160 may be designed in other ways than what is illustrated in the Figures, as long as the above described principles are respected. For instance, the cabin 160 may be arranged with an entry/exit opening which is narrower, wider, taller or lower than illustrated. It may also be arranged with one or several foldable passenger gangways, an external roof, and so forth.

Preferably, the cabin 160, together with the frame 154a and the rolls 172, 174, is movable along a bridge head 150 periphery 152 along a path which is semi-circular. However, this needs not be the case. Hence, the periphery 152 defining the travel path of the frame 154a may be another form than a semi-circular one, for instance one that has a more complex shape, such as stepwise circular or even elliptical or other curved shapes.

The bridge head 150 may be supported on the ground using a support leg, which may be telescopic so as to allow vertical adjustment of the cabin 160 door 161.

There may be more than two gas springs 176a, even though the present inventors have discovered that two such gas springs are normally sufficient.

Hence, the invention is not limited to the described embodiments, but can be varied within the scope of the enclosed claims.

The invention claimed is:

1. A jalousi wall assembly for a passenger bridge, which jalousi wall assembly comprises
    a first jalousi wall, in turn having a first end and a second end, which first end is arranged to be wound up on, and off from, a first roll with a first vertical rotation axis (A2), and which second end is arranged to be fastened to the passenger bridge; and
    a second jalousi wall, in turn having a third end and a fourth end, which third end is arranged to be wound up on, and off from, a second roll with a second vertical rotation axis (A3), and which fourth end is arranged to be fastened to the passenger bridge,
    wherein the first roll is arranged to be fastened to the frame of a movable opening of the passenger bridge and to follow horizontal movements of the said frame by the first jalousi wall being wound up on, or off from, the first roll, whereby a horizontal length of the first jalousi wall, between the first end and the second end, is adjusted in response to a horizontal movement of said frame, and
    wherein the second roll is also arranged to be fastened to the said frame and to follow horizontal movements of the frame by the second jalousi wall being wound up on, or off from, the second roll, whereby a horizontal length of the second jalousi wall, between the third end and the fourth end, is also adjusted in response to a horizontal movement of said frame,
    wherein the jalousi wall assembly further comprises a wire having a first and a second end, which first end is wound about said first vertical rotation axis (A2) such that the first jalousi wall is wound up on the first roll when the wire is pulled at its second end, in that the second end of said wire is wound about said second vertical rotation axis (A3) such that the second jalousi wall is wound up on the second roll when the wire is pulled at its first end, and in that the jalousi wall assembly further comprises a wire tension means comprising a gas spring arranged to maintain a tension in the wire while the frame moves,
    wherein the wire tension means further comprises a pulley system, allowing the wire to move freely along its length direction, and
    the gas spring is arranged to apply a pulling force to the wire via a respective spring-loaded pulley which is in rolling engagement with the wire.

2. The jalousi wall assembly according to claim 1, wherein a total horizontal length of the first and second jalousi walls remains constant as the frame moves horizontally.

3. The jalousi wall assembly according to claim 1, wherein the gas spring is arranged to apply a pulling force perpendicularly to a local wire direction.

4. The jalousi wall assembly according to claim 1, wherein the wire does not engage with the bridge head apart from at its first and second ends engaging with the said first and second rolls.

5. The jalousi wall assembly according to claim 1, wherein neither the first nor the second roll is spring-loaded in itself in a rotary direction, apart from the tension provided by the wire.

6. The jalousi wall assembly according to claim 1, wherein the wire tension means further comprises two respective additional pulleys arranged on either side of each spring-loaded pulley, which two additional pulleys are in rolling engagement with the wire and arranged to apply a counterforce to the spring-loaded pulley.

7. The jalousi wall assembly according to claim 6, wherein the two additional respective pulleys are fixedly connected to the cabin.

8. The jalousi wall assembly according to claim 1, wherein the gas spring is connected at a first end to the cabin, and at a second, opposite, end to the respective spring-loaded pulley.

9. A bridge head for a passenger bridge comprising a cabin, wherein the bridge head comprises a first opening to a passenger bridge end segment and a second opening to the cabin, and in that the bridge head comprises a jalousi wall assembly according to claim 1, arranged to cover both a first and a second vertical side part of the bridge head, running between the first and second openings on one respective side of the bridge head each, with the first and third ends of the jalousi walls fixedly fastened to opposite sides of the first opening and the first and second rolls of the jalousi walls fixedly fastened to either side of the second opening.

10. A passenger bridge comprising a passenger bridge end segment, wherein the passenger bridge comprises a bridge head according to claim 9 arranged at a distal end of said bridge end segment.

11. A jalousi wall assembly for a passenger bridge, which jalousi wall assembly comprises
    a first jalousi wall, in turn having a first end and a second end, which first end is arranged to be wound up on, and off from, a first roll with a first vertical rotation axis (A2), and which second end is arranged to be fastened to the passenger bridge; and
    a second jalousi wall, in turn having a third end and a fourth end, which third end is arranged to be wound up on, and off from, a second roll with a second vertical rotation axis (A3), and which fourth end is arranged to be fastened to the passenger bridge, wherein the first roll is arranged to be fastened to the frame of a movable opening of the passenger bridge and to follow horizontal movements of the said frame by the first jalousi wall being wound up on, or off from, the first roll, whereby a horizontal length of the first jalousi wall, between the first end and the second end, is adjusted in response to a horizontal movement of said frame, and wherein the second roll is also arranged to be fastened to the said frame and to follow horizontal movements of the frame by the second jalousi wall being wound up on, or off from, the second roll, whereby a horizontal length of the second jalousi wall, between the third end and the fourth end, is also adjusted in response to a horizontal movement of said frame, wherein the jalousi wall assembly further comprises a wire having a first and a second end, which first end is wound about said first vertical rotation axis (A2) such that the first jalousi wall is wound up on the first roll when the wire is pulled at its second end, in that the second end of said wire is wound about said second vertical rotation axis (A3) such that the second jalousi wall is wound up on the second roll when the wire is pulled at its first end, and in that the jalousi wall assembly further comprises a wire tension means comprising two gas springs arranged to maintain a tension in the wire while the frame moves, wherein the two gas springs apply a wire tension force at two different locations along the wire between its engagement with the first roll and its engagement with the second roll.

* * * * *